United States Patent
Gupta et al.

(10) Patent No.: US 10,497,042 B2
(45) Date of Patent: Dec. 3, 2019

(54) SEARCH RANKING

(71) Applicant: BloomReach, Inc., Mountain View, CA (US)

(72) Inventors: Apurva Kumar Gupta, Karnataka (IN); Romil Shah, Santa Clara, CA (US); Ramkumar Rajendran, Campbell, CA (US); Sumit Garg, Sunnyvale, CA (US); Soubhik Bhattacharya, Bangalore (IN); Ashutosh Garg, Sunnyvale, CA (US)

(73) Assignee: BloomReach, Inc., Mountain View, CA (US)

( * ) Notice: Subject to any disclaimer, the term of this patent is extended or adjusted under 35 U.S.C. 154(b) by 520 days.

(21) Appl. No.: 15/250,425

(22) Filed: Aug. 29, 2016

(65) Prior Publication Data

US 2018/0060936 A1 Mar. 1, 2018

(51) Int. Cl.
*G06Q 30/00* (2012.01)
*G06F 17/30* (2006.01)
*G06Q 30/06* (2012.01)
*G06F 16/2457* (2019.01)
*G06F 16/951* (2019.01)

(52) U.S. Cl.
CPC ... *G06Q 30/0627* (2013.01); *G06F 16/24578* (2019.01); *G06F 16/951* (2019.01)

(58) Field of Classification Search
CPC .................................................. G06Q 30/0627
See application file for complete search history.

(56) References Cited

U.S. PATENT DOCUMENTS

| | | | |
|---|---|---|---|
| 5,675,819 A | 10/1997 | Schuetze | |
| 7,363,309 B1 | 4/2008 | Waite | |
| 7,366,714 B2 | 4/2008 | Krachman | |
| 7,949,648 B2 | 5/2011 | Jacobsen | |
| 8,086,590 B2 | 12/2011 | Zheng | |
| 8,229,948 B1 | 7/2012 | Ershov | |
| 8,977,621 B1 | 3/2015 | Paiz | |
| 9,779,441 B1* | 10/2017 | Jadhav | G06Q 30/0627 |
| 2009/0037408 A1 | 2/2009 | Rodgers | |
| 2011/0145269 A1 | 6/2011 | Kraftsow | |
| 2013/0091113 A1 | 4/2013 | Gras | |
| 2013/0332438 A1 | 12/2013 | Li | |
| 2014/0222774 A1 | 8/2014 | Gras | |
| 2015/0032717 A1* | 1/2015 | Cramer | G06F 17/30867 |
| | | | 707/709 |
| 2015/0193436 A1* | 7/2015 | Slaney | G06F 17/30675 |
| | | | 707/728 |

OTHER PUBLICATIONS

Patents; "Search system with query refinement and search method" in patent application approval process (USPTO 20160140237). (Jun. 8, 2016). Computer Weekly News Retrieved from https://search.proquest.com/docview/1793366006?accountid=14753.*

* cited by examiner

*Primary Examiner* — Kathleen Palavecino
(74) *Attorney, Agent, or Firm* — Moser Taboada

(57) ABSTRACT

A system for ranking search results can be utilized to make a search engine more effective in finding relevant search results. In embodiments, an e-commerce search engine can identify one or more generic identifiers and one or more nonessential search terms in a search query. The nonessential search terms can be disregarded to generate a set of candidate search results from a product and/or service index.

20 Claims, 6 Drawing Sheets

SEARCH RANKING

BACKGROUND

A common goal amongst e-commerce retailers is to provide relevant search results in response to search queries for products and/or services. Potential consumers may submit such queries to in order to compare products or services, learn more about products or services, or make a purchase.

Potential consumers typically expect relevant results to their search queries, even if such results do not contain all of the actual query terms submitted in the query. For example, search query terms may include a brand name of a product or service, a product quantity, a product or service type, or other details that may not appear on an e-commerce page for the product or service.

Such additional terms may be considered nonessential because relevant products or services that satisfy the searcher's intended query can be identified by ignoring such terms. Often, consumers include such nonessential terms in a search query, but would still be satisfied with search results that do not include any or all such additional search query terms.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
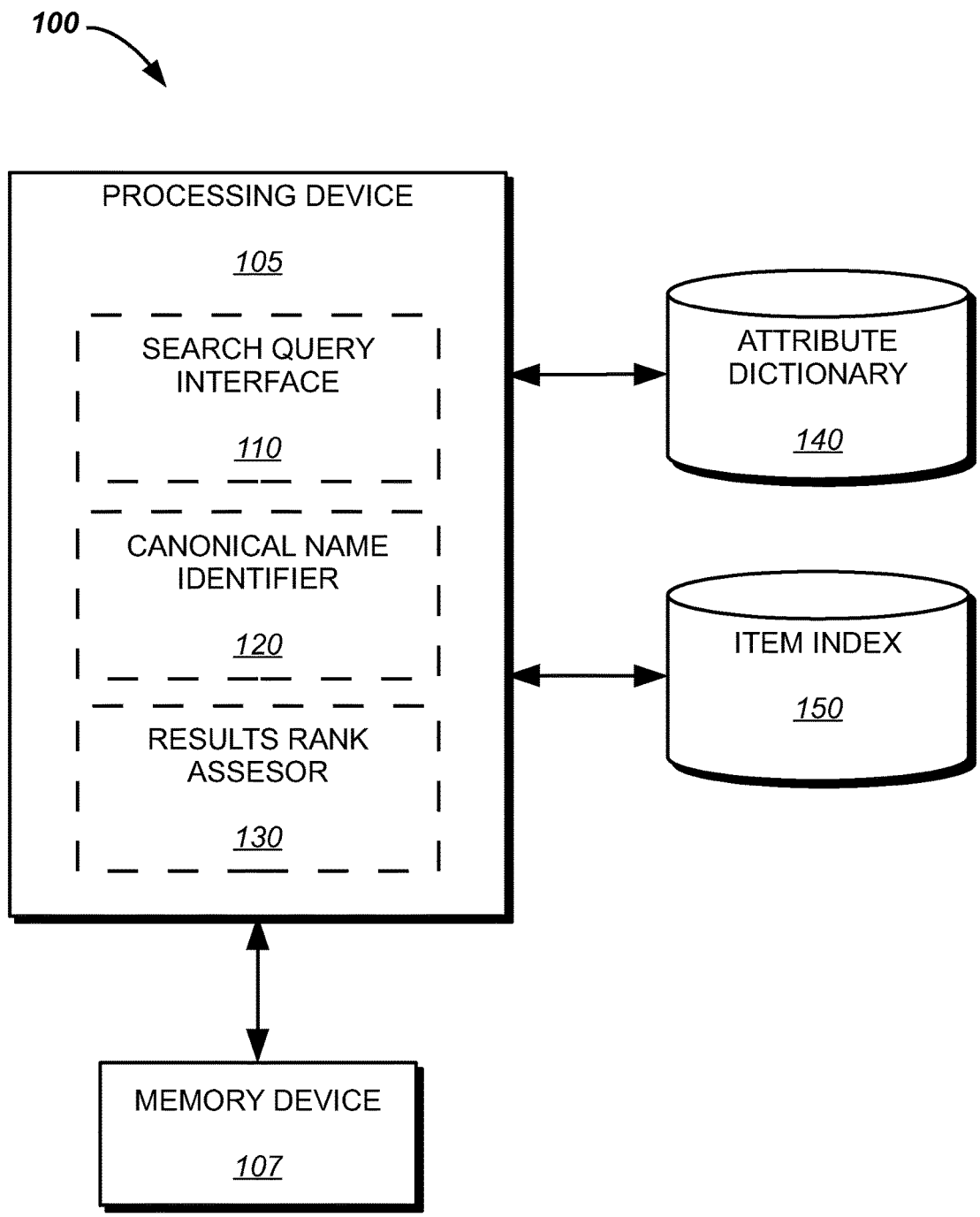
FIG. 1 is a block diagram illustrating a search ranking system according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for ranking search results for queries related to e-commerce. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to receive a search query and interpret the query to recognize canonical product or service names in the search query terms. According to embodiments, nonessential terms may be recognized in the search query terms. In embodiments, such nonessential terms may be disregarded for the purposes of executing the search query. In the present disclosure, the term "nonessential," in the context of a search query term, means a search query term that refers to an attribute, a brand name, or similar characteristic of a product or service. According to various embodiments of the present disclosure, an attribute dictionary may be utilized to identify search query terms that may be treated as nonessential terms.

According to embodiments, search query terms that are not nonessential may identify one or more products and/or services. In the present disclosure, such search query terms may be referred to as "generic identifiers." As examples, a generic identifier may identify a class, category, or type of product or service. In some cases, a generic identifier is a canonical name for a product or service. According to various embodiments of the present disclosure, an attribute dictionary may be utilized to identify search query terms that are generic identifiers.

FIG. 1 is a block diagram depicting a search ranking system 100 according to one embodiment of the present disclosure. In an embodiment, search ranking system 100 includes a computer processing device 105 and memory device 107. In one embodiment, memory device 107 has computer-readable instructions to direct processing device 105 to include a search query interface 110, canonical name identifier 120, and results rank assessor 130. Embodiments of the present disclosure further include an attribute dictionary 140 and an item index 150.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In various embodiments, search query interface 110 is adapted to transmit a search interface to a user and prompt the user to submit a query. According to various embodiments, a user may be a potential consumer for various products or services. Embodiments of search query interface 110 are adapted to receive the search query submitted by users. Such queries may be submitted at a user interface in a merchant software application installed on a mobile computing device (which may generally be referred to as an "app"), in a web browser displaying a website, or by other means. In response to receiving a query from a user, search query interface 110 can transmit the search query string to canonical name identifier 120 for further processing as will be described below.

According to various embodiments, search query interface 110 is adapted to transmit a user interface to a user computing device. The user computer device may comprise a mobile computing device, a laptop computer, a desktop computer, a tablet computer, or other like computing devices having a display object for displaying information to the user and an input object for collecting inputs from the user. The input object may comprise a mouse, a keyboard, a touch-sensitive display, or other computer peripherals utilized to accept inputs from a user.

Figure 2:
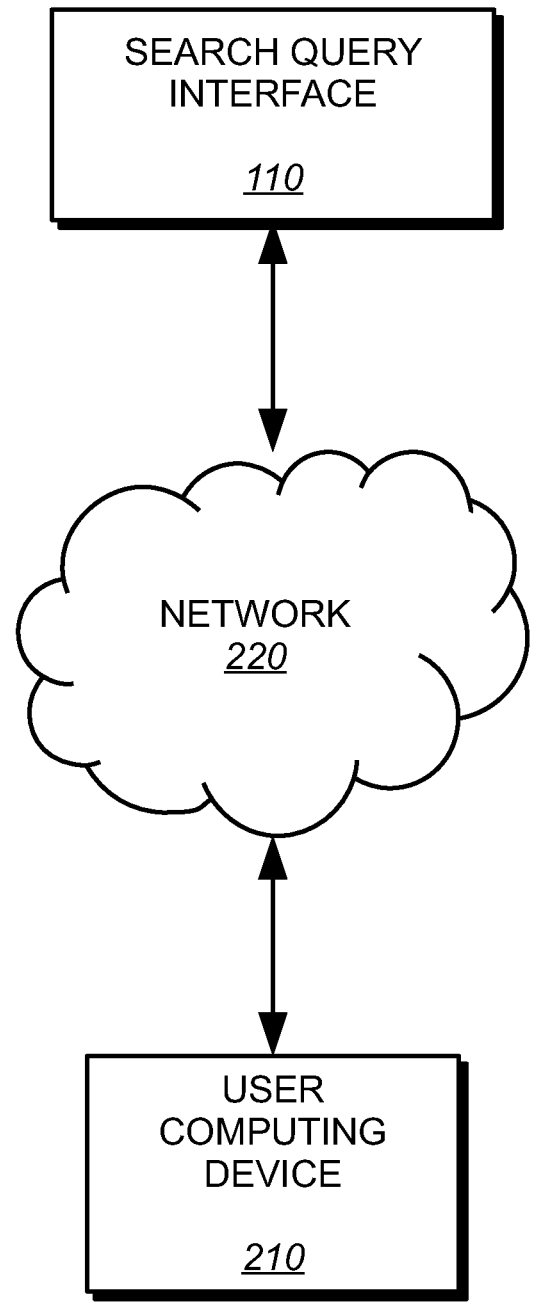
FIG. 2 is a schematic illustrating a network for a search ranking system according to one embodiment of the present disclosure.

Referring to FIG. 2, in one embodiment, the user interface is transmitted from search query interface 110 to user computing device 210 over network 220, directing user computing device 210 to prompt a user to enter a search query. The search query may then be transmitted over network 220 to search query interface 110. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

In embodiments of the present disclosure, canonical name identifier 120 is adapted to receive a search query string from search query interface 110 and identify one or more canonical names that are representative of the search query terms. In embodiments, canonical name identifier 120 can search for said search query terms in attribute dictionary 140. According to various embodiments, attribute dictionary 140 comprises a dictionary of service/product attribute pairs. A service/product attribute pair may include a product and or service that is offered for sale on one or more e-commerce websites and an attribute that describes the product or service. As used in the present disclosure, the term "attribute" means an adjective, an adverb, or other descriptive term(s) that, in some manner, set forth one or more qualities, features, traits, and/or characteristics of a service or product. In some cases, an attribute has a type and a value. For example, an attribute describing the material of an apparel item could be described as "material: cotton," where "material" is the attribute type and "cotton" is the value for that attribute type.

In various embodiments, attribute dictionary 140 includes numerous attributes that were each found to be suitable to describe their respective service(s) and/or product(s). An attribute may be associated with multiple products and/or services listed in attribute dictionary 140 for which the attribute is a suitable descriptor. Likewise, multiple attributes may be associated with any particular product and/or service listed in attribute dictionary 140 for which the attributes are suitable descriptors.

In embodiments of the present disclosure, canonical name identifier 120 can analyze entries in attribute dictionary 140 to identify a synonym, a plural, and/or a hypernym of search query terms. For example, by observing that a relatively high number of service/products are paired with the same attribute or set of attributes, canonical name identifier 120 may determine that the various service/products are synonyms, hypernyms, and/or plurals of each other. Likewise, if multiple attributes are paired with the same service(s) and/or product(s), canonical name identifier 120 may determine that said attributes are synonyms, hypernyms, and/or plurals of each other.

In some embodiments, canonical name identifier 120 can search various types of dictionaries that include synonyms, hypernyms, and/or plurals of items offered for sale. Such dictionaries may indicate the canonical name for said items.

In various embodiments, canonical name identifier 120 is adapted to analyze the attributes, services, and/or products stored in attribute dictionary 140 to determine a canonical name for each attribute, service, and/or product. According to embodiments, canonical name identifier 120 is adapted to determine one or more aliases of said canonical names for products and/or services. According to embodiments, canonical name identifier 120 is adapted to determine localized spellings or other types of variants of said canonical names for products and/or services. According to various embodiments, a canonical name comprises a generic term for the type of product or service indicated.

According to various embodiments, canonical name identifier 120 is adapted to transmit to results rank assessor 130 the search query and any relevant canonical names. In one example, the search query text string is transmitted to results rank assessor 130 with metadata that indicates synonyms, hypernyms, and/or plurals of each term in the text string. In one example, the search query text string is transmitted with metadata that indicates the canonical name for any products and/or services represented in search query terms.

In embodiments of the present disclosure, results rank assessor 130 is adapted to receive a search query text string and associated metadata, and carry out a search in item index 150 for terms from the search query text string and/or from the metadata. In various embodiments, item index 150 comprises a database of products and/or services offered for sale in an e-commerce setting. Embodiments of data stored at item index 150 include product/service titles, product/service descriptions, product/service categories, product/ service manufacturer or brand names, product/service attributes, and like information regarding various products and/or services.

In one embodiment, results rank assessor 130 is adapted to formulate search terms based on the search query and the metadata received from canonical name identifier 120. For example, the search terms may include a canonical name for a product and/or service identified in the search query text string. As another example, the search terms may include a synonym, hypernym, and/or plural term for one or more terms included in the search query text string.

In one embodiment, results rank assessor 130 compares search terms against terms in item index 150. Embodiments of results rank assessor 130 can search for search terms in item index 150 to generate a list of candidate search results. In one embodiment, candidate search results are identified by word similarity to a search term. In embodiments, the candidate search results can be ranked according to relevance to the search terms.

In one embodiment, only canonical names and/or aliases thereof are included as search terms to search in item index 150, while other search query terms are considered as nonessential and may thus be ignored. By using only canonical names and/or synonyms thereof for search terms, results rank assessor 130 may identify numerous candidate search results that are relevant to the initial search query.

Following the compilation of candidate search results, the candidate search results may be ranked according to relevance to the search query. In this embodiment, candidate search results can be ranked according to word similarity to all search terms and search query terms, including the nonessential terms. In one example, a submitted search query includes one or more generic terms for a product and one or more brand names that corresponds to the product. Results rank assessor 130 may analyze the search query terms to determine a canonical name for the product. The canonical name may be used as a search term to search item index 150, while the brand name(s) and other nonessential terms may be disregarded. A set of products that match the search term(s) may be assembled as candidate search results.

In one embodiment of the present disclosure, results rank assessor 130 can rank the candidate search results in order of relevancy by comparing all search query terms, including both generic terms, brand name terms, and other search query terms.

In embodiments, results rank assessor 130 is adapted to return a list of ranked candidate search results to search query interface 110, which may transmit instructions to user computing device 210 to display the list to the user in response to the search query submission. In one embodiment, the search results are displayed as hyperlinks to product and/or service pages on an e-commerce website or app, where the user can execute a purchase of the corresponding products and/or services.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 3:
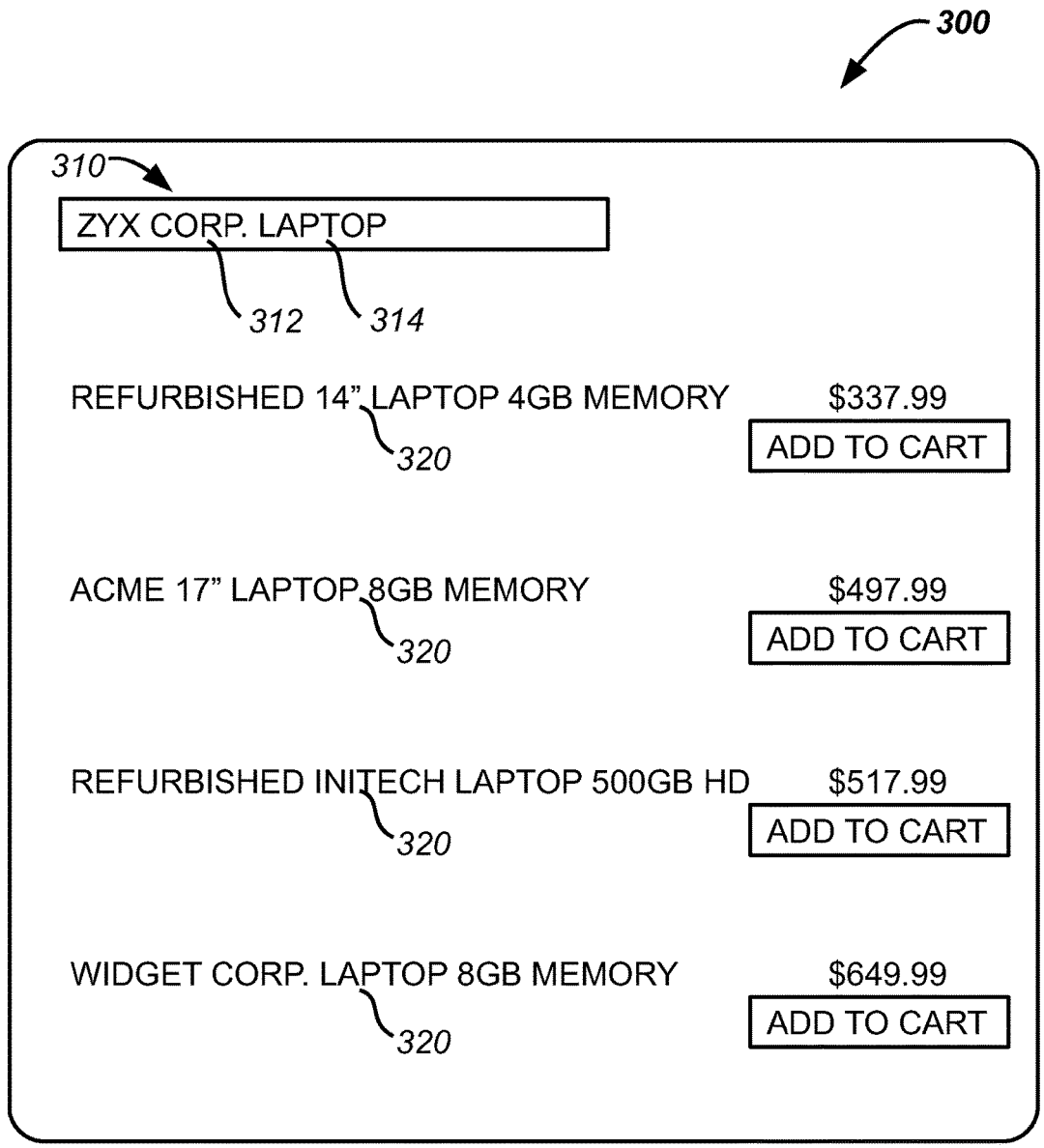
FIG. 3 is an illustration of a user search interface displaying search results according to one embodiment of the present disclosure.

In operation, embodiments of the present disclosure may receive a search query related to an e-commerce website and/or application, interpret the query to recognize canonical product or service names in the search query terms, and rank search results. Referring now to FIG. 3, an illustrative search results page 300 is depicted according to one embodiment of the present disclosure. In the embodiment depicted, a search query 310 was submitted by a user, the query 310 comprising a brand name "ZYX CORP." 312, and generic identifier "LAPTOP" 314 for the desired product. According to the example depicted, no products having a brand name "ZYX CORP." were found in the item database. However, canonical name identifier 120 had identified the search term "LAPTOP" 314 as a canonical product name, which subsequently enabled results rank assessor 130 to find several results 320 that were tagged with the canonical term "LAPTOP" 314. In the example depicted, the query term "ZYX CORP." 312 was disregarded as a nonessential search term.

Figure 4:
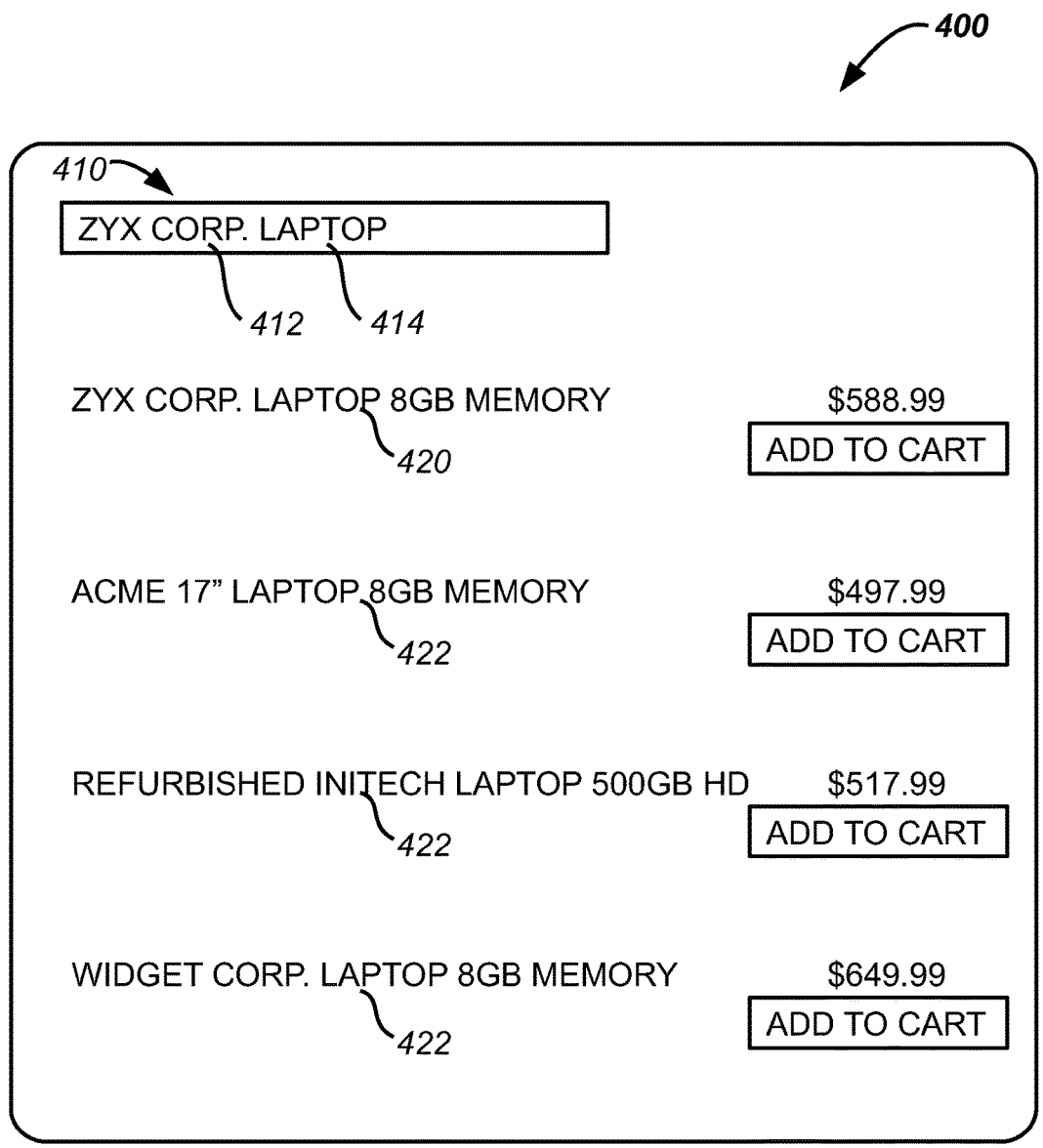
FIG. 4 is an illustration of a user search interface displaying search results ranked using nonessential terms according to one embodiment of the present disclosure.

Referring now to FIG. 4, an illustrative search results page 400 is depicted according to one embodiment of the present disclosure. In the embodiment depicted, a search query 410 was submitted by a user, the query 410 comprising a brand name "ZYX CORP." 412, and generic identifier "LAPTOP" 414 for the desired product. According to the example depicted, canonical name identifier 120 had identified the search term "LAPTOP" 414 as a canonical product name, subsequently enabling results rank assessor 130 to find several results 420, 422 as candidate search results that were associated with the canonical name "LAPTOP" 414. In the example depicted, the query term "ZYX CORP." 412 was used by results rank assessor 130 to rank search result 420 before results 422.

Figure 5:
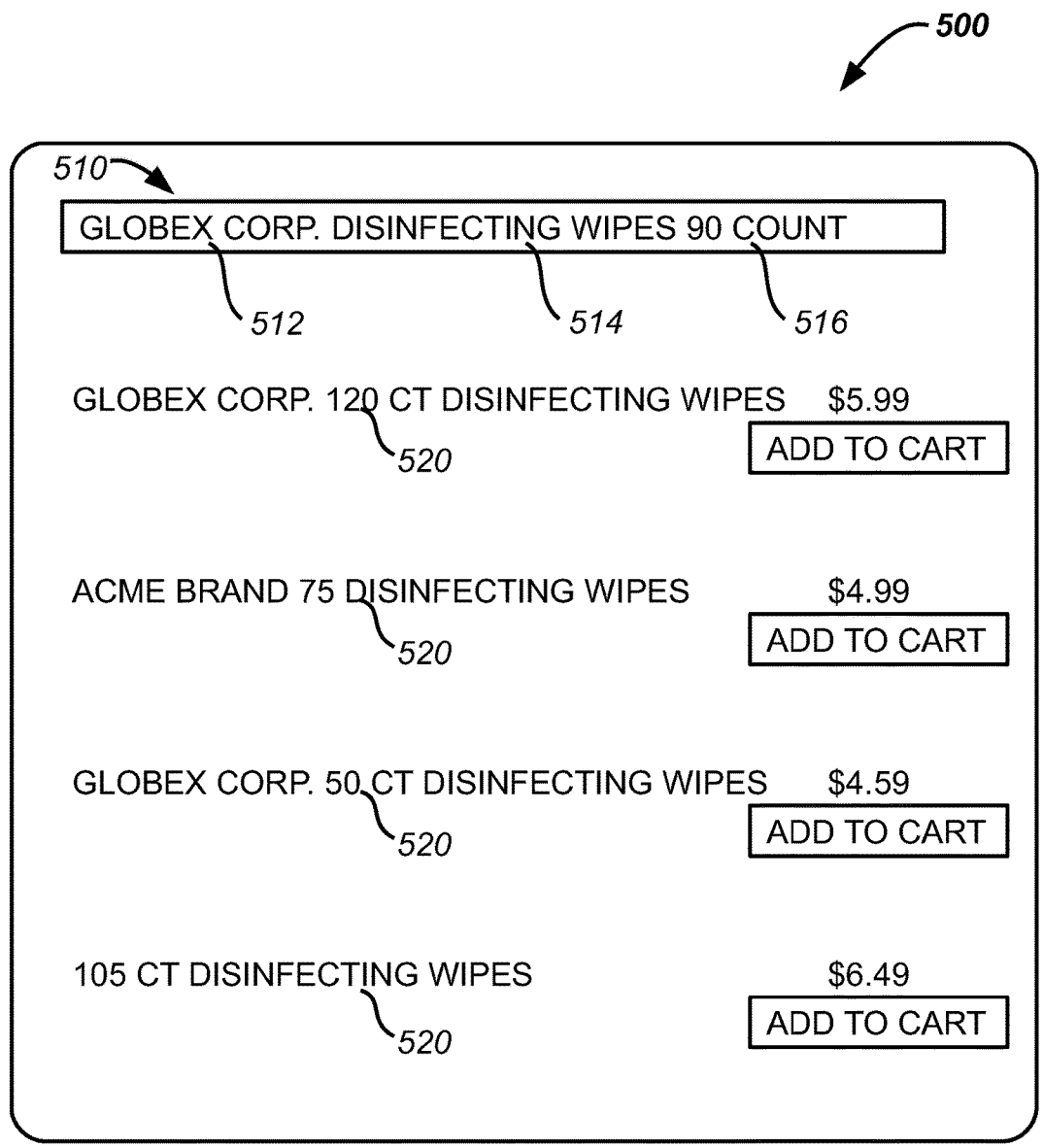
FIG. 5 is an illustration of a user search interface displaying search results for a search query having quantity attribute terms according to one embodiment of the present disclosure.

Referring now to FIG. 5, an illustrative search results page 500 is depicted according to one embodiment of the present disclosure. In the embodiment depicted, a search query 510 was submitted by a user, the query 510 comprising a brand name "GLOBEX CORP." 512, a generic identifier "DISINFECTING WIPES" 514 for the desired product, and a quantity "90 COUNT" 516. According to the example depicted, canonical name identifier 120 had identified the search term "DISINFECTING WIPES" 514 as a canonical product name, subsequently enabling results rank assessor 130 to find several results 520 as candidate search results that were associated with the canonical name "DISINFECTING WIPES" 514. The search terms "GLOBEX CORP." 512 and "90 COUNT" 516 were disregarded to identify candidate search results. In the example depicted, there were no search results found that included the query term "90 COUNT" 516. Accordingly, results rank assessor 130 identified and displayed search results 520 that comprise other quantities as dictated by product availability.

According to embodiments, a search results page can include hyperlinks that lead to and/or encourage purchases of one or more of the search results. In embodiments, results rank assessor 130 is adapted to rank search results in order of probability of purchase, determined by analyzing the search query.

Figure 6:
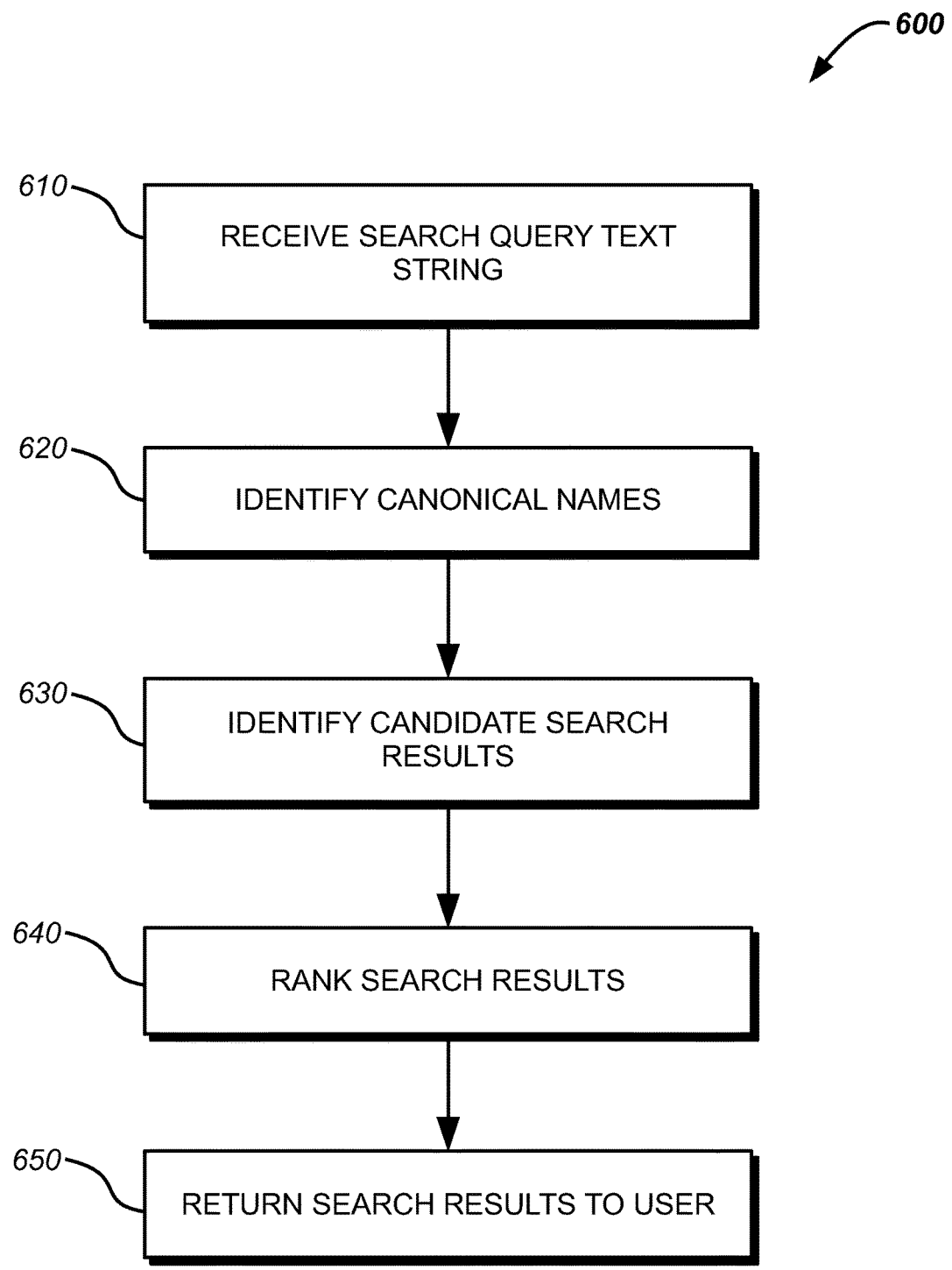
FIG. 6 is a flow-chart illustration of a method of ranking search results according to one embodiment of the present disclosure.

Referring now to FIG. 6, embodiments of the present disclosure include a method 600 of executing a search for products and/or services in response to a submitted search query on an e-commerce website or application. Method 600 begins at RECEIVE SEARCH QUERY TEXT STRING 610. At operation 610, a user has submitted a search query via a search query interface. In embodiments, the user inputs a search query at a search query interface via a browser on a computing device such as a laptop, desktop computer, or a mobile computing device such a smartphone or tablet device. In other embodiments, the user inputs a search query at a search query interface via a mobile computing application, which may otherwise be known as an "app," on a mobile computing device such as a smartphone or tablet device. According to various embodiments, the user may intend to purchase a product and/or service for which the user searches.

In some embodiments, a submitted search query comprises a text string. The search query text string may include one or more search terms that may be considered nonessential because relevant products or services that satisfy the searcher's intended query can be identified by ignoring such terms. Nonessential search terms may include brand names or terms that refer to specific details of products such as a model name/number or product attributes.

Following operation 610, method 600 proceeds to operation 620 IDENTIFY CANONICAL NAMES. According to embodiments, at IDENTIFY CANONICAL NAMES 620, canonical name identifier is adapted to receive the search query text string from the search query interface. Embodiments of canonical name identifier are further adapted to and identify one or more canonical names that are representative of one or more search terms in the query. In one embodiment of IDENTIFY CANONICAL NAMES 620, canonical name identifier can search an attribute dictionary to determine appropriate canonical names. In another embodiment of IDENTIFY CANONICAL NAMES 620, canonical name identifier can search other types of dictionaries to determine a canonical name. For example, canonical name identifier can search a dictionary comprising synonyms, hypernyms, plurals, and/or canonical names for various products and/or services.

Following operation 620, method 600 proceeds to operation 630 IDENTIFY CANDIDATE SEARCH RESULTS. In one embodiment of IDENTIFY CANDIDATE SEARCH RESULTS 630, results rank assessor can carry out a search for one or more search terms in an index of products and/or services. In the present disclosure, such an index may be referred to as an item index. In some embodiments of IDENTIFY CANDIDATE SEARCH RESULTS 630, numerous item indexes may be searched. According to various embodiments, results rank assessor is adapted to search for entries in the index that match one or more canonical names that correspond to search query terms.

In various embodiments of IDENTIFY CANDIDATE SEARCH RESULTS 630, results rank assessor is adapted to disregard nonessential terms from the submitted search query.

In various embodiments of IDENTIFY CANDIDATE SEARCH RESULTS 630, any number of candidate search results may be identified. In some embodiments, a similarity threshold may be established in order to limit the number of candidate search results. In embodiments of IDENTIFY CANDIDATE SEARCH RESULTS 630, various text matching and/or text comparison algorithms may be carried out to compare the search terms with entries in the item index.

Following operation 630, method 600 proceeds to operation 640 RANK SEARCH RESULTS. According to embodiments of RANK SEARCH RESULTS 640, results rank assessor is adapted to rank candidate search results according to relevance to the search query. In one embodiment, terms from each candidate search result are compared to each term from the submitted search query and an aggregate matching score is determined for the candidate search result. In this embodiment, all search query terms are compared to the candidate search results, including nonessential search terms.

In embodiments of RANK SEARCH RESULTS 640, results rank assessor can rank the candidate search results according to each candidate's respective aggregate matching score. In other embodiments of RANK SEARCH RESULTS 640, results rank assessor can rank the candidate search results according to additional metrics. For example, in one example, results rank assessor is adapted to predict the likelihood that any particular candidate search result will be purchased.

Following operation 640, method 600 proceeds to operation 650 RETURN SEARCH RESULTS TO USER. In embodiments of RETURN SEARCH RESULTS TO USER 650, the top ranked candidate search results are transmitted to the user's computing device to be displayed for the user. In one embodiment, the results are displayed in an ordered list according to ranking.

In various embodiments of RETURN SEARCH RESULTS TO USER 650, each listed search result comprises a hyperlink that may facilitate purchase of the corresponding product or service. In one embodiment of RETURN SEARCH RESULTS TO USER 650, the user may interact with the user interface to view additional details of selected search results.

In one embodiment of the present disclosure, RETURN SEARCH RESULTS TO USER 650 is carried out as a function within a software application on a mobile computing device such as a smartphone or tablet computer. In one embodiment of the present disclosure, RETURN SEARCH RESULTS TO USER 650 is carried out by displaying the search results on a browser.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for carrying out a search, comprising:
   at an e-commerce search engine, receiving a search query from a user, the search query entered by the user via a computer peripheral of a computing device;
   parsing the search query into one or more search query terms, the search query terms comprising a nonessential search term and a generic identifier;
   at a canonical name identifier, comparing each of the search query terms against entries in a dictionary to determine a canonical name for each generic identifier;
   comparing the canonical name for each generic identifier against entries in an item index to identify a set of candidate search results;
   at a results rank assessor, ranking the set of candidate search results according to relevance of the search query terms to the entries in the item index to generate a ranked search results list; and
   transmitting the ranked search results list to the user.

2. The method of claim 1, wherein the item index comprises a product index.

3. The method claim 1, further comprising analyzing an attribute dictionary to determine a canonical name for each generic identifier.

4. The method claim 1, wherein the nonessential search term comprises a brand name, and wherein the brand name is not used to identify a set of candidate search results and is only to rank the set of candidate search results.

5. The method claim 1, wherein the nonessential search term comprises an item attribute, and wherein the item attribute is not used to identify a set of candidate search results.

6. The method of claim 1, wherein ranking the set of candidate search results according to relevancy of the search query terms to the entries in the item index comprises ranking the set of candidate search results according to relevancy of the nonessential search term to the entries in the item index.

7. The method of claim 1, wherein ranking the candidate search results is further based on an order of probability of a purchase of a product or service corresponding to the search query.

8. A computer-implemented method for carrying out a search, comprising:
   at a search interface, receiving a search query string entered by a user via a computer peripheral of a computing device, the search query string comprising a nonessential search term and a generic identifier;
   at a canonical name identifier, comparing each search query term in the search query string against entries in a dictionary to determine a canonical name that is associated with each generic identifier;
   at a results rank assessor, comparing the canonical name for each generic identifier against entries in an item index to identify a set of candidate search results;
   at the results rank assessor, ranking the candidate search results according to relevance to the search query string thereby forming a ranked search results list; and
   transmitting the ranked search results list to the user.

9. The method of claim 8, wherein the item index comprises a product index.

10. The method of claim 8, further comprising analyzing the attribute dictionary to determine a canonical name for each generic identifier.

11. The method of claim 8, wherein the nonessential search term comprises a brand name, and wherein the brand name is not used to identify a set of candidate search results.

12. The method of claim 8, wherein the nonessential search term comprises an item attribute, and wherein the item attribute is not used to identify a set of candidate search results.

13. The method of claim 8, wherein ranking the candidate search results according to relevance to the search query string comprises ranking the candidate search results according to relevance to the nonessential search term.

14. The method of claim 8, wherein ranking the candidate search results is further based on an order of probability of a purchase of a product or service corresponding to the search query.

15. A computer system for ranking search results comprising:
    a search ranking system comprising a memory and a processing device, the memory storing computer-readable instructions directing the processing device to:
    receive a search query from a user computing device, the search query entered by the user via a computer peripheral of a computing device;
    parse the search query into one or more search query terms, the search query terms comprising a nonessential search term and a generic identifier;
    compare each of the search query terms against entries in a dictionary to determine a canonical name for each generic identifier;
    compare the canonical name for each generic identifier against entries in an item index to identify a set of candidate search results;
    rank the set of candidate search results according to relevancy of the search query terms to the entries in the item index to generate a ranked search results list; and
    transmit the ranked search results list to the user computing device.

16. The system of claim 15, wherein the item index comprises a product index.

17. The system of claim 15, wherein the computer-readable instructions further direct the processing device to analyze an attribute dictionary to determine a canonical name for each generic identifier.

18. The system of claim 15, wherein the nonessential search term comprises a brand name, and wherein the brand name is not used to identify a set of candidate search results.

19. The system of claim 15, wherein the nonessential search term comprises an item attribute, and wherein the item attribute is not used to identify a set of candidate search results.

20. The system of claim 15, wherein the computer-readable instructions further direct the processing device to rank the set of candidate search results according to relevancy of the nonessential search term to the entries in the item index.

* * * * *